United States Patent [19]
Sayegh

[11] Patent Number: 5,615,293
[45] Date of Patent: Mar. 25, 1997

[54] FIBER OPTIC CABLE ASSEMBLY FOR FACILITATING THE INSTALLATION THEREOF IN A STRUCTURE

[75] Inventor: Emile G. Sayegh, Austin, Tex.

[73] Assignee: W. L. Gore & Associates, Inc., Newark, Del.

[21] Appl. No.: 593,603

[22] Filed: Jan. 30, 1996

[51] Int. Cl.[6] .................................................. G02B 6/44
[52] U.S. Cl. ........................ 385/102; 385/100; 385/106; 385/107; 385/136
[58] Field of Search ................................... 385/100, 102, 385/103, 104, 106, 107, 110, 111, 112, 113, 114, 136, 137

[56] References Cited

U.S. PATENT DOCUMENTS

| | | | |
|---|---|---|---|
| 4,241,979 | 12/1980 | Gagen et al. | 385/114 X |
| 4,687,294 | 8/1987 | Angeles | 385/102 X |
| 4,781,433 | 11/1988 | Arroyo et al. | 385/102 X |
| 5,002,359 | 3/1991 | Sayegh | 385/102 X |
| 5,189,721 | 2/1993 | Sayegh et al. | 385/114 |
| 5,253,318 | 10/1993 | Sayegh et al. | 385/114 |
| 5,293,442 | 3/1994 | Sayegh | 385/102 |
| 5,402,516 | 3/1995 | Blyler, Jr. et al. | 385/114 X |

*Primary Examiner*—Brian Healy
*Attorney, Agent, or Firm*—Victor M. Genco, Jr.

[57] ABSTRACT

An improved fiber optic cable assembly is provided which has made integral therewith a strength member that may be gripped or rigorously pulled to facilitate the installation of the fiber optic cable assembly in a structure.

14 Claims, 6 Drawing Sheets

FIBER OPTIC CABLE ASSEMBLY FOR FACILITATING THE INSTALLATION THEREOF IN A STRUCTURE

FIELD OF THE INVENTION

This invention generally relates to optical transmission media. More particularly, the present invention relates to an improved fiber optic cable assembly that is configured to be gripped or pulled to facilitate its installation in a structure.

BACKGROUND OF THE INVENTION

Optical fiber systems are revolutionizing such industries as the telecommunication and computer industries. These optical fiber systems are more economical and more robust than alternatives that have been used in the past, such as copper wire, radio relay, or satellite configurations. In order to be used effectively, optical fibers must be adequately protected from the effects of mechanical, thermal, and environmental stresses. Moreover, the optical fiber package should lend itself to density, cost effective termination, ease of routing, and upgradability.

In the past, fiber optic cables typically comprised bundles of fiber optic filaments contained within a cylindrical covering or casing having a circular cross section. Such cylindrically shaped fiber optic cables are not well adapted for use in electronic packaging requiring very high component density. Cables having a circular cross section have the additional disadvantage of requiring a larger radius of curvature to complete a given turn as the number of filaments contained within the cross section is increased. Cables having a round cross section are typically difficult to bifurcate so as to service or terminate at more than two ends. Additionally, as a fiber optic cable having a circular cross section is increased in diameter, packaging difficulty is experienced in routing the cable through ducting, around corners within electronic assemblies, under modules, or under and around multi-layer interconnection circuit boards.

An improved building block for optical systems is an optical fiber ribbon structure (e.g., an optical fiber ribbon cable) which, because of its two-dimensional nature, simplifies aligning of the fiber ends, which facilitates termination procedures. An optical fiber ribbon structure may be the optimal cable solution for complex cable management problems. Optical fiber ribbon cables provide large fiber count with small cable diameter, low profile, and low skew between fibers. The optical fiber ribbon cable also provides mechanical support and protection. These ribbon cables, by totally enclosing the fibers, can additionally reduce mechanical abrasion and risk of exposure to moisture and other ambient hazards. U.S. Pat. Nos. 5,189,721 and 5,253,318, which are incorporated herein by reference, describe two fiber optic ribbon cables which have been particularly successful when employed in various applications.

Although optical fiber ribbon cables perform successfully in use, known optical fiber ribbon cables are not configured to be gripped or pulled to facilitate their installation in a structure. More particularly, in certain applications it is desirable to install in a structure pre-terminated optical fiber cable assemblies having at least one optical connector precisely terminated to at least one end of the cable. In such applications, it is often necessary to route such pre-terminated cable assemblies through a tortuous path that may include walls, duct work, ceilings, or floors. Often, it is necessary to rigorously grip and/or pull such cable assemblies through such a tortuous path, and such gripping and pulling must be accomplished without damaging the precise connection that has been achieved between the optical connector and the cable assembly.

Typically, in the past, optical connectors have been employed as "makeshift handles" for gripping and pulling cable assemblies. Not suprisingly, such activity destroys the precise connection existing between an optical connector and a cable assembly to which it has been terminated. Alternatively, gripping devices have been employed to pull a cable through a structure. Although such gripping devices have operated with varying degrees of success, typically such gripping devices may not attach to a cable in a fashion that does not exert a load upon either the optical fibers or the optical connector, which of course may cause damage to the precisely pre-terminated cable.

The foregoing illustrates limitations known to exist in present fiber optic cable assemblies. Thus, apparently it would be advantageous to provide an improved fiber optic cable assembly directed to overcoming one or more of the limitations set forth above. Accordingly, a suitable alternative is provided including features more fully disclosed hereinafter.

SUMMARY OF THE INVENTION

The present invention advances the art of optical transmission media beyond which is known to date. In one aspect of the present invention a fiber optic cable assembly is provided comprising at least one optically transmissive fiber and a first strength member disposed about the at least one optically transmissive fiber. A first polymer jacket is disposed about the first strength member. A second strength member is disposed about the first polymer jacket along a length of the fiber optic cable assembly. A second polymer jacket may be disposed about the second strength member.

In an alternate embodiment of the present invention, a multi-podded fiber optic cable assembly comprises: a first pod defined by at least one optically transmissive fiber, a first strength member disposed about the optically transmissive fiber, and a first polymer jacket disposed about the first strength member; and at least a second pod defined by at least one optically transmissive fiber, a first strength member disposed about the optically transmissive fiber, and a first polymer jacket disposed about the first strength member. At least one second strength member is disposed about the first and second pods along a length of the fiber optic cable assembly. A web is disposed about the second strength member.

It is a purpose of the present invention to provide an improved fiber optic cable assembly that is configured to facilitate the installation thereof in a structure.

It is another purpose of the present invention to provide an improved fiber optic cable assembly that may be rigorously gripped and pulled without damaging an optical connector terminated to the cable assembly.

BRIEF DESCRIPTION OF THE DRAWINGS

The foregoing summary, as well as the following detailed description of a preferred embodiment of the invention, will be better understood when read in conjunction with the appended drawings. For purposes of illustrating the invention, there is shown in the drawings an embodiment that is presently preferred. It should be understood, however, that the invention is not limited to the precise arrangement and instrumentality shown. In the drawings.

DETAILED DESCRIPTION OF THE INVENTION

Figure 3:
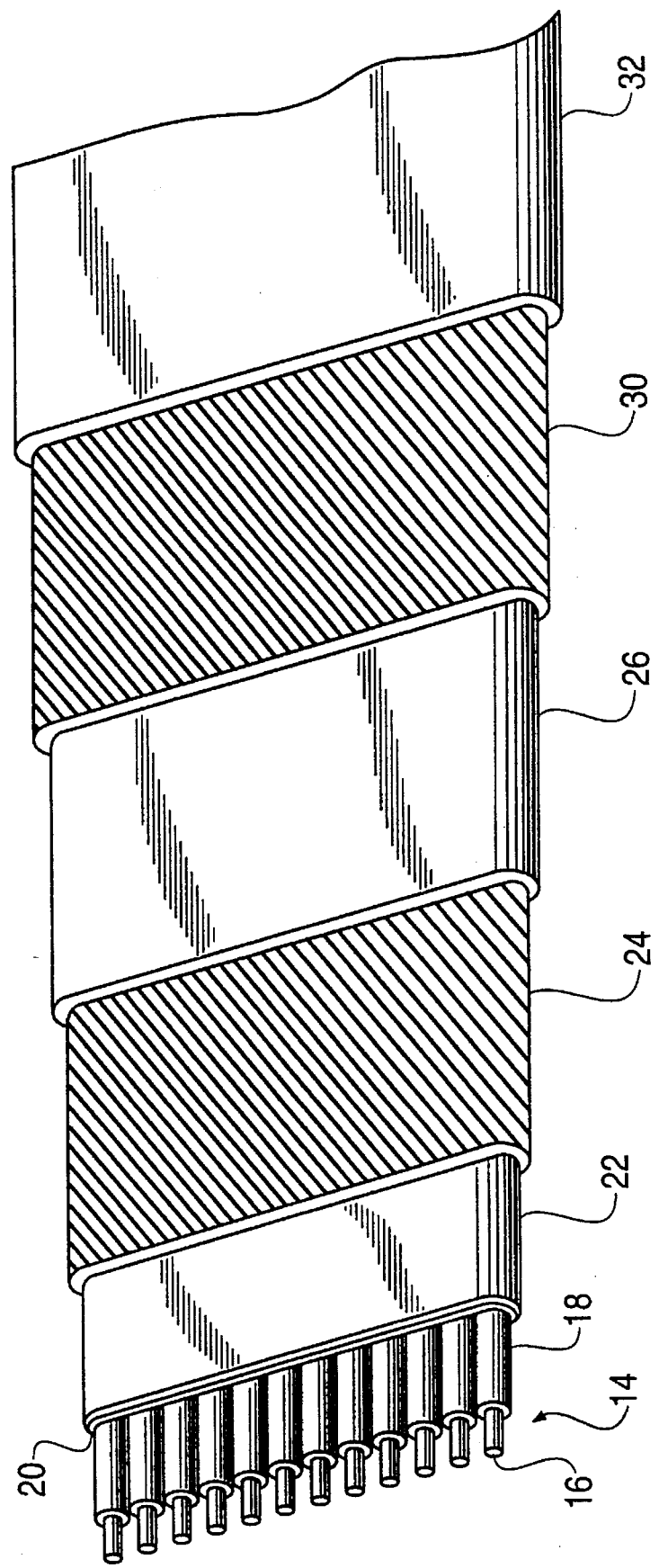
FIG. 3 is a perspective view of an alternate embodiment of the present invention.
Figure 4:
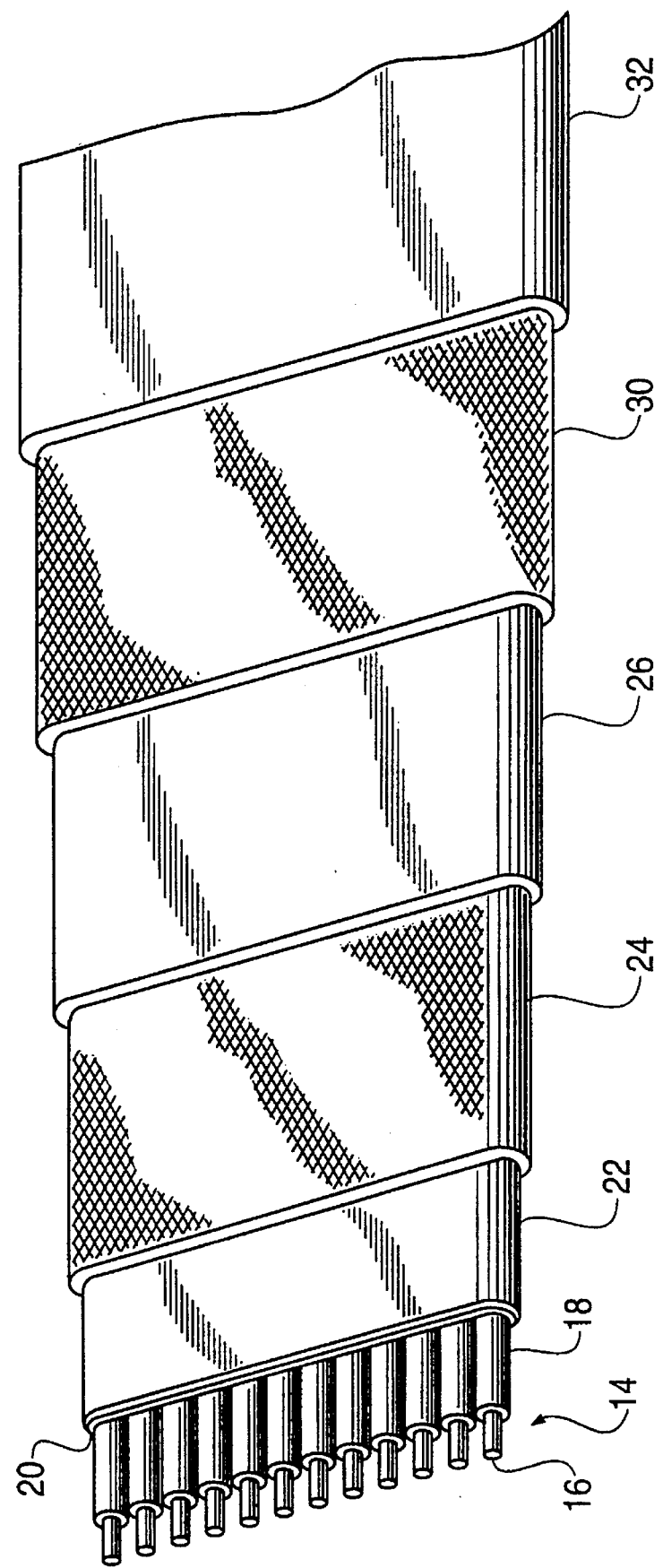
FIG. 4 is a perspective view of an alternate embodiment of the present invention.
Figure 5:
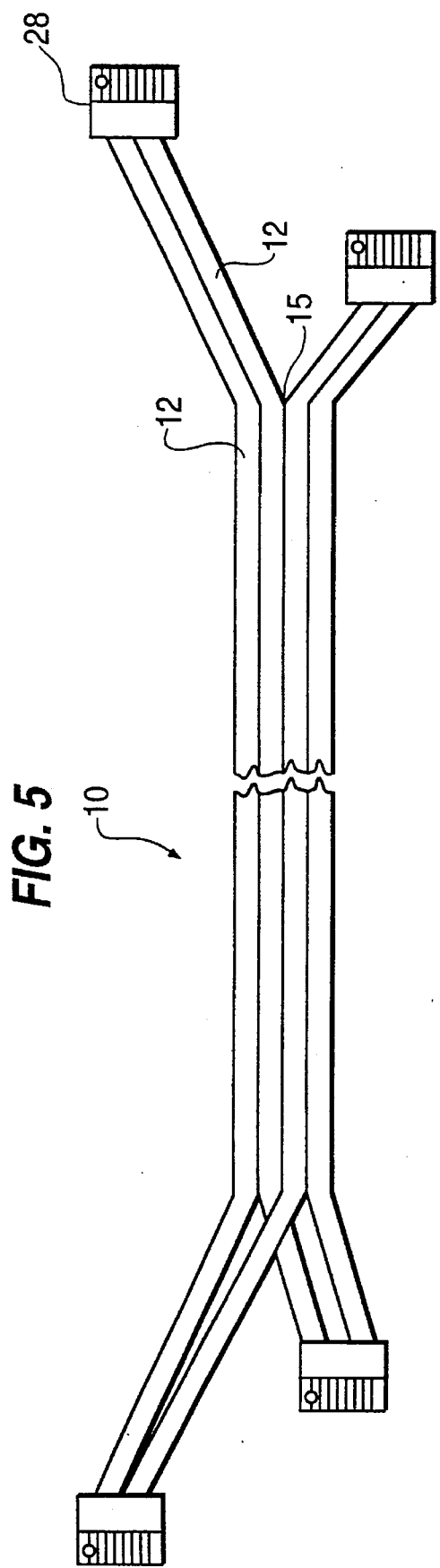
FIG. 5 is a perspective view of an alternate embodiment of the present invention.

An improved fiber optic cable assembly is generally indicated at 10 in FIGS. 1–6. As best illustrated in FIG. 5, the fiber optic cable assembly may be comprised of a plurality of optical fiber pods 12. In such an embodiment of the present invention, each pod is configured similarly to the fiber optic cable assembly 10 that is illustrated in FIGS. 1–4, and which is described in detail hereinafter.

As best illustrated in FIGS. 1–4, the improved fiber optic cable assembly 10 of the present invention includes at least one optically transmissive glass fiber 14. Although fiber optic ribbon cable configurations are illustrated in FIGS. 1–4 which are comprised of a plurality of optically transmissive glass fibers 14 arranged in a generally parallel, planar relationship to each other, it should be understood that the teachings of the present invention may be incorporated into a fiber optic cable assembly comprising a single optically transmissive glass fiber 14.

In the embodiment illustrated in FIG. 5, a web 15 surrounds the optical fiber pods 12. The web 15 spaces the optical fiber pods 12 at a predetermined fixed distance one to each other, and the web material also fixedly locates the optical fiber pods in a generally planar, parallel relationship one to each other. As the term is used herein, porous polytetrafluoroethylene (PTFE) shall mean a membrane which may be prepared by any number of known processes, for example, by stretching or drawing processes, by papermaking processes, by processes in which filler materials are incorporated with the PTFE resin and which are subsequently removed to leave a porous structure, or by powder sintering processes. Preferably, the porous polytetrafluoroethylene membrane is porous expanded polytetrafluoroethylene membrane having a microstructure of interconnected nodes and fibrils, as described in U.S. Pat. Nos. 3,953,566; 4,187,390; and 4,110,392; which are incorporated herein by reference, and which fully describe the preferred material and processes for making them. The porous polytetrafluoroethylene membrane may have a thickness in a range from about 3 to about 1,000 micrometers, preferably in a range of from about 5 to about 100 micrometers, and a pore volume in a range from about 20 to about 98 percent.

The optical fibers may be defined by a conventional core 16 and a cladding 18. The core 16 may comprise any suitable light transmitting material, such as but not limited to, pure silica ($SiO_2$) glass, silica ($SiO_2$) glass doped with a suitable material such as germania ($GeO_2$), heavy metal fluoride-based glass, chalcogenide glass, fluoride-based glass, borosilicate-based glass, or plastic, for example. Surrounding the core 16 is a cladding 18 that may be comprised of, for example, a pure silica, or an amorphous fluoropolymer. The cladded core may additionally be coated with a polyimide, acrylic, polyether ether keytone, polyurethane or other suitable polymer coatings. The amorphous fluoropolymer may be a homopolymer of bis(trifluoromethyl)difluorodioxole or a copolymer with tetrafluoroethylene or other fluorinated ethylenes. The core 16, cladding 18 and coatings are generally known in the art and may be obtained as an integral optical fiber from such suppliers as Corning Incorporated, or AT & T, for example.

The optical fiber(s) 14 may be surrounded by one or more of the following: a buffer material 20, a binder 22, a strength member 24, or a protective polymer jacket 26. The buffer material 20 may have a thickness ranging from about 0.002 to about 0.012 inches. The binder material 22 may have a thickness ranging from about 0.002 to about 0.012 inches. The protective polymer jacket 26 may have a thickness ranging from about 0.005 to about 0.090 inches. The web 15 may have a thickness ranging from about 0.005 to about 0.050 inches.

The buffer material 20 may be at least in part porous polytetrafluoroethylene, polyester, foamed polyethylene, porous polypropylene, foamed polyurethane, foamed polytetrafluoroethylene, foamed fluorinated ethylenepropylene, foamed polyvinyl chloride, foamed rubber, closed cell porous films, porous polypropylene films, or a combination of any of the foregoing, for example.

The binder material 22 may be at least in part porous polytetrafluoroethylene, polytetrafluoroethylene, fluoropolymer based materials, or polyester.

The strength member 24 may comprise fibers, such as but not limited to, fibers of aramid, polyester, polytetrafluoroethylene, polysulfone, or polyamide fibers. One example of a suitable fibrous strength member is KEVLAR® yarn, a product that is commercially available from E. I. DuPont de Nemours. KEVLAR® is a DuPont trademark for a family of aramid fibers. Such fibrous material may be a short fiber, as well as continuous filament yarn. It has a relatively high tensile strength and its properties are reported in Information Bulletin K-506A dated, 1980 and entitled "Properties and Uses of KEVLAR® 29 and KEVLAR® 49 In Electromechanical Cables and Fiber Optics."

The protective polymer jacket 26 may be comprised of such materials as porous polytetrafluoroethylene, polyimide, nylon, polyether ether ketone, organopolysiloxane-imide, polyester, polyester terephthalate, full density polytetrafluoroethylene, tetrafluoroethylene-hexafluoropropylene copolymer, perfluoroalkyl tetrafluoroethylene, ethylene-tetrafluoroethylene copolymer, copolymer of ethylene and PTFE, polyvinyl chloride, rubber, silicone, polyethylene, polyvinylidene fluoride, thermoplastic elastomers and urethane. If a polymer jacket 26 is employed, the external dimension of the polymer jacket should be suitably dimensioned to precisely mate with any suitable optical connector apparatus 28. An example of a suitable multi-fiber connector is an MT ferrule type connector that may be obtained from U.S. Conec Ltd. of Hickory, N.C., or Europtics of the United Kingdom.

The cable assembly 10 of the present invention has made integral therewith a means for gripping, manipulating and/or pulling the cable assembly (e.g., a gripping member)in a manner that does not damage the precise connection between the optical connector 28 and the optical fiber or fibers 14. The gripping, manipulating and/or pulling means is defined by a second strength member 30 that is disposed about the fiber optic cable assembly 10. The strength member 30 is similar to the strength member 24, which is described in detail hereinabove. More particularly, the strength member 30 may comprise fibers, such as but not limited to, fibers of aramid, polyester, polytetrafluoroethylene, polysulfone, or polyamide fibers. In a preferred embodiment of the present invention, the strength member 24 is disposed about the fiber optic cable assembly 10 in layered fashion between the protective polymeric jacket 26 and a second, outer polymeric jacket 32 that serves to protect the second strength member from physical damage. Also, in a preferred embodiment of the present invention, the second strength member runs continuously along the length of the cable assembly. However, it is contemplated that the second strength member may be selectively disposed along predetermined length portions of the fiber optic cable assembly 10.

Figure 1:
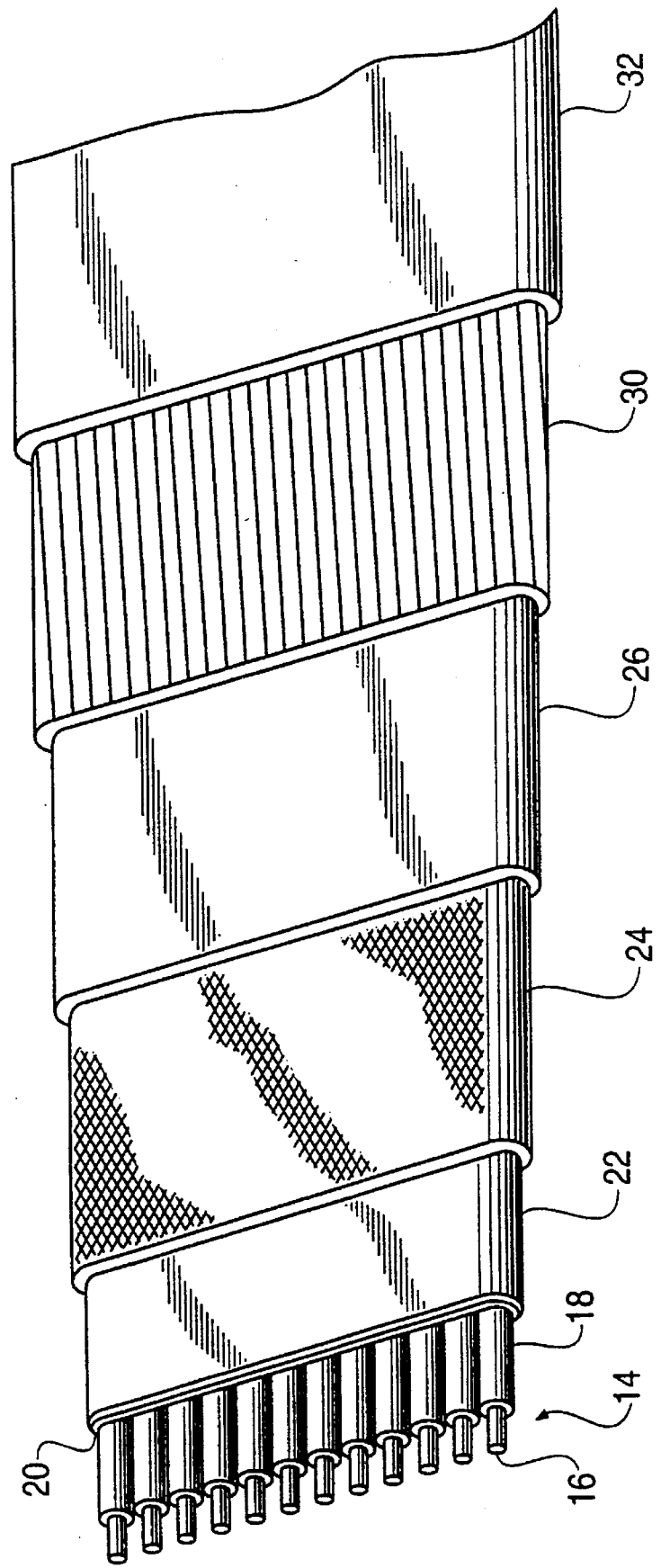
FIG. 1 is a perspective view of one embodiment of the present invention.
Figure 2:
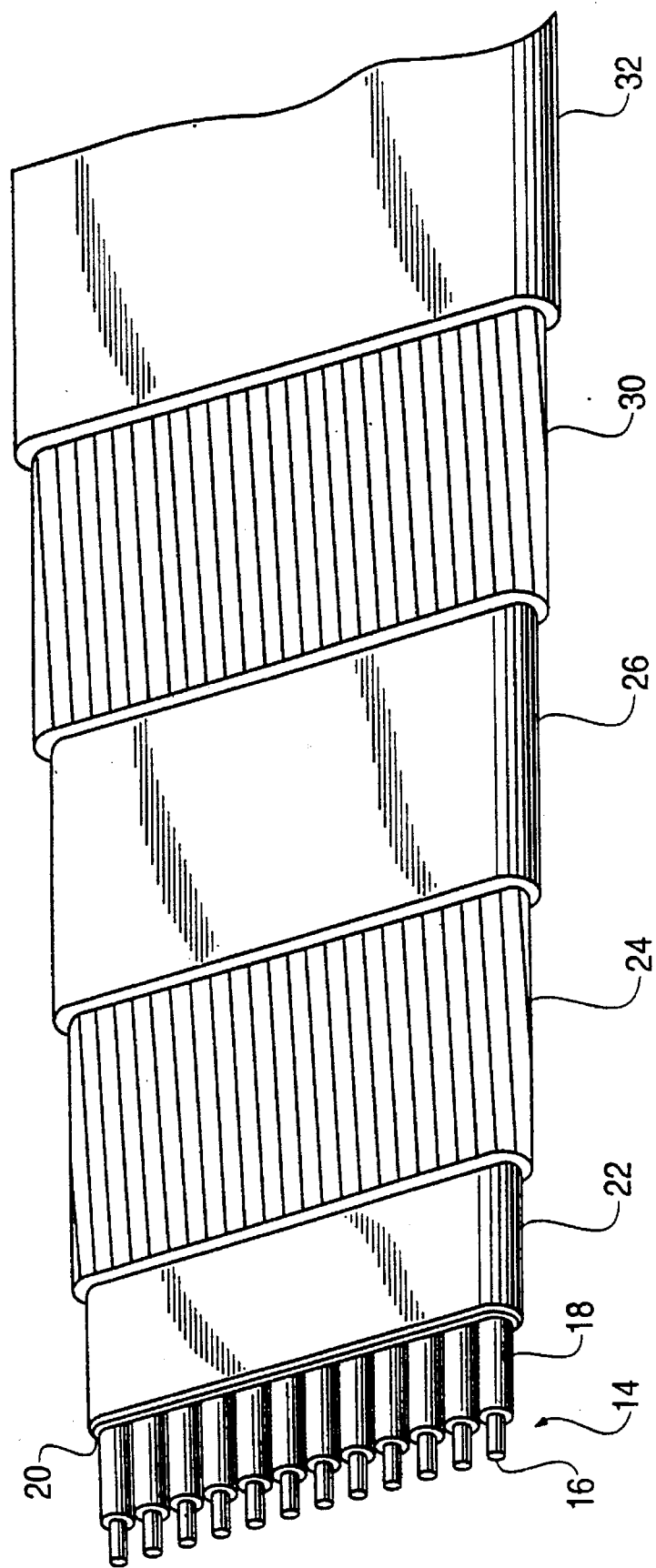
FIG. 2 is a perspective view of an alternate embodiment of the present invention

Either the first or second strength members, 24,30 respectively, may be arranged within the fiber optic cable assembly in any suitable fashion. For example, FIG. 1 illustrates a cable assembly 10 having a first braided strength member 24, and a second strength member 30 that is disposed linearly about the cable assembly. FIG. 2 illustrates first and second strength members, 24,30 respectively, which is each disposed linearly about the cable assembly. FIG. 3 illustrates first and second served strength members, 24,30 respectively, which is each disposed in a helically wrapped fashion about the cable assembly 10. Finally, FIG. 4 illustrates first and second braided strength members, 24,30 respectively.

The multi-podded fiber optic cable assembly may be formed by extruding a web 15 about at least two optical fiber pods 12. More particularly, a predetermined number of built up optical fiber pods 12 are spooled separately to an extrusion die having a predetermined shape. Thereafter, the web 15 may be extruded to surround the optical fiber pods and form the multi-podded fiber optic cable assembly. The extruded web 15 should be comprised of a material having a lower melt temperature than the material of the protective polymer jacket 32.

During the manufacturing of a multi-podded fiber optic cable assembly, applied tensions to the various optical fiber pods should be equal with respect to each optical fiber pod. Also, process temperatures should not exceed predetermined acceptable process temperatures of the optical fibers or of the materials employed.

Figure 6:
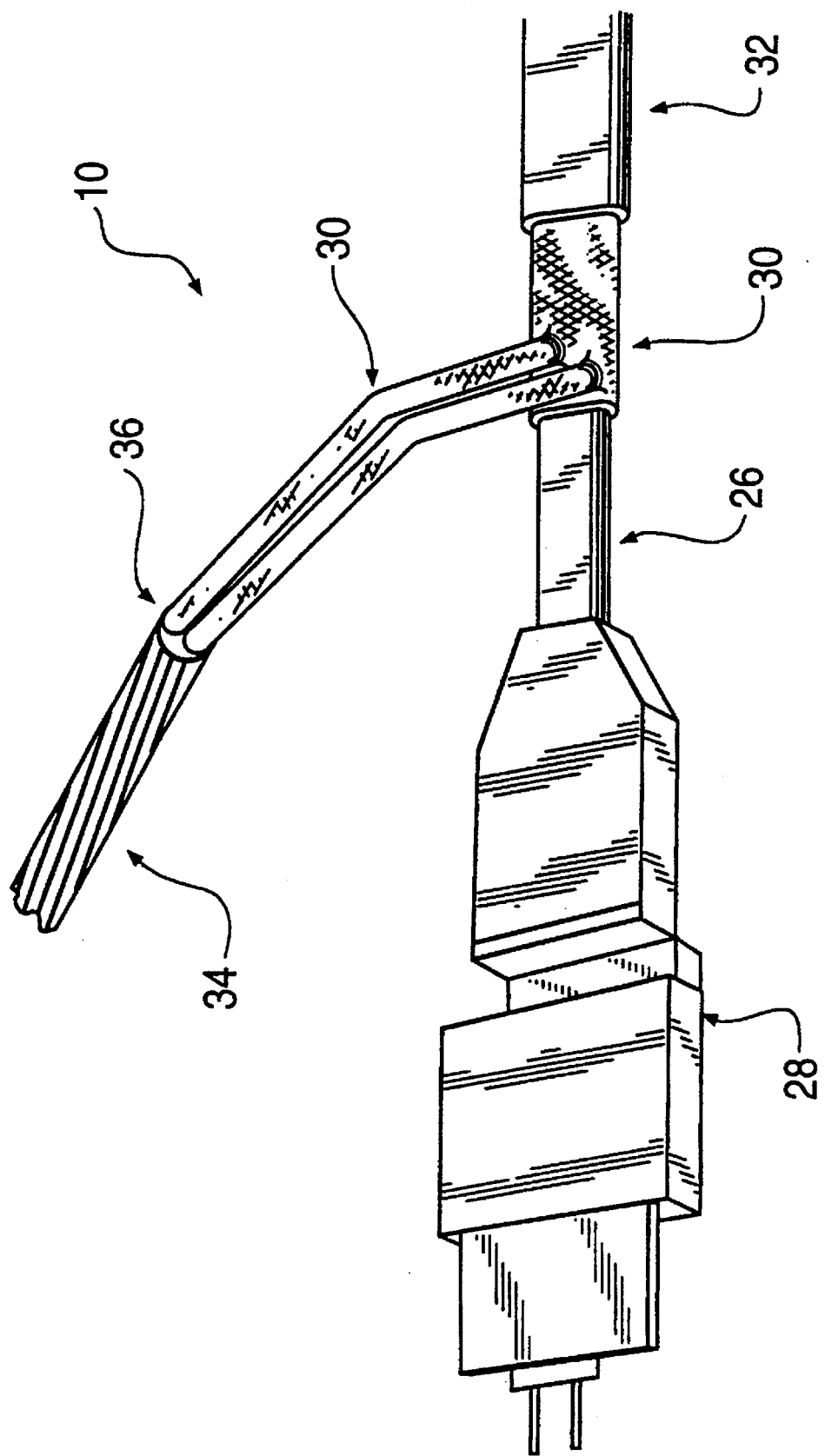
FIG. 6 is a view of one embodiment of the present invention attached to a gripping mechansim.

As best seen by FIG. 6, during installation of a cable assembly made in accordance with the teachings of the present invention, the second outer protective polymeric jacket 32 is removed to expose a predetermined length of the second strength member 30. Thereafter, a suitable gripping device 34, such as a gripping rope, is attached to the second strength member at a predetermined location 36. In this fashion, the fiber optic cable assembly 10 may be rigorously gripped and pulled, without damage to the terminated fiber optic cable assembly 10, during its installation in a structure. Another suitable gripping device (not shown) may comprise a base portion and a handle portion. Formed integrally with the base portion of such a gripping device may be a plurality of hooks for attaching such a gripping means to the exposed section of the strength member 30. In addition to the foregoing, the second strength member itself may serve as a gripping means.

As may be appreciated from the foregoing, a fiber optic cable assembly made in accordance with the teachings of the present invention may be rigorously gripped and pulled without damaging the optical fibers 14, or the precise termination between a connector 28 and the cable assembly. Additionally, a gripping device may be quickly attached or detached to the fiber optic cable assembly of the present invention without comprising the structural integrity of the inside polymeric jacket 26.

Although a few exemplary embodiments of the present invention have been described in detail above, those skilled in the art readily appreciate that many modifications are possible without materially departing from the novel teachings and advantages that are described herein. Accordingly, all such modifications are intended to be included within the scope of the present invention, as defined by the following claims.

Having described the invention, what is claimed is:

1. In combination with a gripping mechanism, a fiber optic cable assembly comprising:

at least one optically transmissive fiber;

a first strength member disposed about the at least one optically transmissive fiber;

a polymer jacket disposed about the first strength member; and a second strength member disposed about the polymer jacket, said second strength member being disposed along a length of fiber optic cable assembly, said second strength member adapted to be gripped by said gripping mechanism to facilitate installation of the fiber optic cable assembly in a structure.

2. The fiber optic cable assembly of claim 1 further including a second polymer jacket disposed about said second strength member.

3. The fiber optic cable assembly of claim 1, wherein the second strength member runs continuously along the length of the fiber optic cable assembly.

4. The fiber optic cable assembly of claim 1 further comprising a buffer material surrounding the at least one optically transmissive fiber.

5. The fiber optic cable assembly of claim 4, wherein the buffer material is at least in part selected from a group consisting of: porous polytetrafluoroethylene, polyester, foamed polyethylene, porous polypropylene, foamed polyurethane, foamed polytetrafluoroethylene, foamed fluorinated ethylenepropylene, foamed polyvinyl chloride, foamed rubber, closed cell, porous films, and porous polypropylene films.

6. The fiber optic cable assembly of claim 1 further including a binder material surrounding the at least one optically transmissive fiber.

7. The fiber optic cable assembly of claim 6, wherein the binder material is at least in part selected from a group consisting of: porous polytetrafluoroethylene, polytetrafluoroethylene, fluoropolymer based materials, and polyester.

8. The fiber optic cable assembly of claim 1, wherein the first and second strength members comprises a material selected from a group consisting of: braided fibers and served fibers.

9. The fiber optic cable assembly of claim 1, wherein the first and second strength members are selected from a group consisting of: polyester, polytetrafluoroethylene, aramid, polysulfone, and polyamide fibers.

10. The fiber optic cable assembly of claim 2, wherein first and second polymer jackets are selected from a group consisting of: nylon, polyimide, polyether ether ketone, organopolysiloxane-imide, polyester, polyester terephthalate, porous polytetrafluoroethylene, full density polytetrafluoroethylene, tetrafluoroethylene-hexafluoropropylene copolymer, perfluoroalkoxy tetrafluoroethylene, ethylenetetrafluoroethylene copolymer, copolymer of ethylene and PTFE, polyvinyl chloride, rubber, silicone, polyethylene, polyvinylidene fluoride, thermoplastic elastomers and urethane.

11. In combination with a gripping a mechanism, a multi-podded fiber optic cable assembly comprising:
- a first pod defined by at least one optically transmissive fiber, a first strength member disposed about the at least one optically transmissive fiber, and a first polymer jacket disposed about the first strength member,
- at least a second pod defined by at least one optically transmissive fiber, a first strength member disposed about the at least one optically transmissive fiber, and a polymer jacket disposed about the first strength member;
- a second strength member disposed about the first and second pods, said second strength member running along a length of the fiber optic cable assembly, said second strength member adapted to be gripped by said gripping mechanism; and
- a web disposed about said second strength member.

12. The multi-podded fiber optic cable assembly of claim 11, wherein the web comprises in part a material selected from a group consisting of: polyimide, polyether ether ketone, organopolysiloxane-imide, polyester, polyester terephthalate, porous polytetrafluoroethylene, full density polytetrafluoroethylene, tetrafluoroethylene-hexafluoropropylene copolymer, perfluoroalkoxy tetrafluoroethylene, ethylene-tetrafluoroethylene copolymer, copolymer of ethylene and PTFE, polyvinyl chloride, rubber, silicone, polyethylene, polyvinylidene fluoride, thermoplastic elastomers and urethane.

13. The fiber optic cable assembly of claim 1, wherein at least a first end thereof is terminated to an optical connector.

14. The multi-podded fiber optic cable assembly of claim 11, wherein at least a first end thereof is terminated to an optical connector.

* * * * *